US012157796B2

(12) United States Patent
Takao et al.

(10) Patent No.: US 12,157,796 B2
(45) Date of Patent: Dec. 3, 2024

(54) METHOD FOR PRODUCING DECOLORED POLYESTER, DECOLORED POLYESTER, AND DECOLORING AGENT

(71) Applicants: SHINTECH CORPORATION, Kyoto (JP); JEPLAN, INC., Kawasaki (JP)

(72) Inventors: Masaki Takao, Yokohama (JP); Toru Sakai, Tsuruga (JP); Hiroshi Fujita, Yawata (JP); Shuji Inada, Suita (JP)

(73) Assignees: SHINTECH CORPORATION, Kyoto (JP); JEPLAN, INC., Kawasaki (JP)

( * ) Notice: Subject to any disclaimer, the term of this patent is extended or adjusted under 35 U.S.C. 154(b) by 637 days.

(21) Appl. No.: 17/438,588

(22) PCT Filed: Apr. 15, 2019

(86) PCT No.: PCT/JP2019/016145
§ 371 (c)(1),
(2) Date: Sep. 13, 2021

(87) PCT Pub. No.: WO2020/213032
PCT Pub. Date: Oct. 22, 2020

(65) Prior Publication Data
US 2022/0169786 A1   Jun. 2, 2022

(51) Int. Cl.
*C08G 63/90* (2006.01)
*C08J 11/06* (2006.01)

(52) U.S. Cl.
CPC .............. *C08G 63/90* (2013.01); *C08J 11/06* (2013.01)

(58) Field of Classification Search
CPC ................................. C08G 63/80; C08J 11/06
USPC ......................................................... 521/48
See application file for complete search history.

(56) References Cited

U.S. PATENT DOCUMENTS

| 7,052,556 | B1 | 5/2006 | Montie |
| 7,258,750 | B1 | 8/2007 | Montie |
| 7,416,612 | B1 | 8/2008 | Montie |
| 7,744,701 | B1 | 6/2010 | Montie |
| 7,879,155 | B1 | 2/2011 | Montie |
| 2013/0261197 | A1 | 10/2013 | Bacchiocchi |
| 2015/0059103 | A1 | 3/2015 | Liu et al. |

FOREIGN PATENT DOCUMENTS

| CN | 105008508 A | | 10/2015 |
| DE | 19646421 A1 | | 5/1997 |
| EP | 2834293 B1 | | 11/2018 |
| ES | 2703932 T3 | | 3/2019 |
| JP | 50-38777 A | | 4/1975 |
| JP | 50038777 A | * | 4/1975 |
| JP | 54112265 A | * | 9/1979 |
| JP | 2003238673 A | | 8/2003 |
| JP | 2004217871 A | * | 8/2004 |
| JP | 2005-330444 A | | 12/2005 |
| JP | 2007254904 A | | 10/2007 |
| JP | 5189266 B | | 4/2008 |
| JP | 2009-68127 A | | 4/2009 |
| WO | 03/064752 A1 | | 8/2003 |
| WO | 2013/151640 A2 | | 10/2013 |

OTHER PUBLICATIONS

Examination Report issued on May 5, 2022 in corresponding Indian Application No. 202127047318; 6 pages.
Submission of Publication issued on Jun. 8, 2022 in Japanese Application No. 2020-019175; 9 pages (with English translation).
International Search Report issued on Jul. 16, 2019 in corresponding International Application No. PCT/JP2019/016145; 5 pages.
Japanese Office Action issued on Jun. 28, 2022 in corresponding Japanese Application No. 2020-019175; (13 pages, Including English translation).

* cited by examiner

*Primary Examiner* — Michael M. Bernshteyn
(74) *Attorney, Agent, or Firm* — Maier & Maier, PLLC

(57) ABSTRACT

A method for producing a decolorized polyester according to the present invention includes: a step of preparing a polyester colored with a colorant, and a decolorizing agent containing a glycol ether-type compound having a boiling point at atmospheric pressure of 160° C. or higher; and a step of removing the colorant, by bringing the decolorizing agent into contact at least once with the colored polyester while heating the decolorizing agent to a temperature equal to or lower than a melting point of the polyester, to thereby obtain the decolorized polyester.

11 Claims, No Drawings

METHOD FOR PRODUCING DECOLORED POLYESTER, DECOLORED POLYESTER, AND DECOLORING AGENT

FIELD

The present invention relates to a method for producing a decolored (decolorized) polyester, a decolored (decolorized) polyester, and a decoloring (decolorizing) agent.

BACKGROUND

A polyester (for example, polyethylene terephthalate) is widely used as fibers, films, resin molded products or the like due to excellent properties thereof. However, effective use of waste such as polyester waste (fiber waste, film waste, resin waste) generated in these manufacturing processes and used PET bottles becomes a major issue not only in terms of cost but also in terms of environment. Material recycling, thermal recycling, chemical recycling or the like has been studied and proposed as these treatment methods.

In the material recycling, waste of polyester molded products such as the used PET bottles is collected mainly by local governments and actively reused. However, it is extremely difficult to apply this recycling method to the fiber waste, and there are no examples of reuse thereof.

Further, the thermal recycling has an advantage that the polyester waste containing the fiber waste can be converted into fuel and heat of combustion thereof can be reused. However, since a calorific value of the polyester is relatively low, a large amount of the polyester waste has to be burned in order to utilize the heat of combustion thereof. Therefore, there are problems of loss of a polyester raw material and generation of carbon dioxide, which is not preferable from the viewpoint of resource saving and environmental protection.

On the other hand, in the chemical recycling, the polyester waste is recycled into a raw material monomer, and then the recycled raw material monomer is subjected to a polycondensation reaction again to produce a new polyester (see, for example, Patent Document 1). Therefore, there is little deterioration in the quality of the polyester during recycling, and it is excellent for closed-loop recycling. However, the chemical recycling also mainly targets the resin waste and the film waste.

Here, the polyester fibers are usually colored with a dye in the case of clothing use. Therefore, it is important to remove the dye in order to recycle the polyester from the discarded fiber waste via the raw material monomer. It is known that when a large amount of the dye is mixed in the recycled raw material monomer, the recycled polyester is colored (particularly yellowed).

A chemical recycling method has been proposed in which a dye is removed from a colored fibrous polyester, and then a recycled polyester is obtained again via a raw material monomer (see, for example, Patent Document 2). This Patent Document 2 describes that heated monoethylene glycol is used as a dye extraction solvent.

However, according to the study of the present inventors, in the method described in Patent Document 2, it has been found that a sufficient dye extraction effect (removal effect) cannot be obtained as long as a large amount of the heated monoethylene glycol is not repeatedly brought into contact with the fibrous polyester. This is because solubility of the dye into the monoethylene glycol is low. Further, in the method described in Patent Document 2, it also has been found that the fibrous polyester is dissolved into the monoethylene glycol when the dye is extracted, and a reduced mass (weight loss) thereof reaches 10 to 15% so that a raw material yield is decreased.

Patent Document

Patent document 1: JP5189266B
Patent document 2: JP2005-330444A

SUMMARY

The present invention has been made to solve the above problems. It is an object of the present invention to provide a method for producing a decolorized polyester, which efficiently obtains the decolorized polyester by removing a colorant from a polyester colored with the colorant, a decolorized polyester, and a decolorizing agent that can be used to produce the decolorized polyester.

In order to achieve the object, the present invention includes the following features (1) to (15).

(1) A method for producing a decolorized polyester, comprising:
a step of preparing a polyester colored with a colorant, and a decolorizing agent containing a glycol ether-type compound having a boiling point at atmospheric pressure of 160° C. or higher; and
a step of removing the colorant, by bringing the decolorizing agent into contact at least once with the colored polyester while heating the decolorizing agent to a temperature equal to or lower than a melting point of the polyester, to thereby obtain the decolorized polyester.

(2) The method for producing a decolorized polyester according to the above feature (1), wherein the glycol ether-type compound contains a glycol monoether.

(3) The method for producing a decolorized polyester according to the above feature (1) or (2), wherein the number of carbon atoms of the glycol ether-type compound is in the range of 5 to 15.

(4) The method for producing a decolorized polyester according to any one of the above features (1) to (3), wherein an amount of the glycol ether-type compound contained in the decolorizing agent is 80 mass % or more.

(5) The method for producing a decolorized polyester according to any one of the above features (1) to (4), wherein a heating temperature of the decolorizing agent is in the range of 160 to 210° C.

(6) The method for producing a decolorized polyester according to any one of the above features (1) to (5), wherein a contact time per once of the heated decolorizing agent with the colored polyester is in the range of 5 to 30 minutes.

(7) The method for producing a decolorized polyester according to any one of the above features (1) to (6), wherein the number of contacts of the heated decolorizing agent with the colored polyester is in the range of 1 to 7 times.

(8) The method for producing a decolorized polyester according to any one of the above features (1) to (7), wherein in each contact of the heated decolorizing agent with the colored polyester, an amount of the heated decolorizing agent brought into contact with 1 part by mass of the colored polyester is in the range of 1 to 10 parts by mass.

(9) The method for producing a decolorized polyester according to any one of the above features (1) to (8), wherein the colorant has a chromophore containing nitrogen atoms, and an amount of the nitrogen atoms contained in the decolorized polyester is 30 ppm or less.

(10) The method for producing a decolorized polyester according to any one of the above features (1) to (9), wherein the polyester contains 65 mass % or more of polyethylene terephthalate.

(11) The method for producing a decolorized polyester according to any one of the above features (1) to (10), wherein the colorant contains a disperse dye.

(12) The method for producing a decolorized polyester according to any one of the above features (1) to (11), wherein the polyester is fibrous or flaky.

(13) The method for producing a decolorized polyester according to any one of the above features (1) to (12), wherein the colored polyester which is fibrous is in the form of clothing.

(14) A decolorized polyester obtained by removing a colorant having a chromophore containing nitrogen atoms from a polyester colored with the colorant,
wherein an amount of the nitrogen atoms contained in the decolorized polyester is 30 ppm or less.

(15) A decolorizing agent used for decolorizing a polyester colored with a colorant by removing the colorant therefrom,
wherein the decolorizing agent contains a glycol ether-type compound having a boiling point at atmospheric pressure of 160° C. or higher.

According to the present invention, it is possible to decolorize by efficiently removing a colorant from a polyester colored with the colorant, without weight loss thereof or while preventing severe weight loss thereof. Therefore, the colored polyester, which has been mostly incinerated or landfilled, can be reused as a raw material for a chemical recycling process. As a result, closed-loop recycling to bring the polyester into a recycled polyester becomes possible, which can contribute to construction of a recycling-oriented society.

DETAILED DESCRIPTION

Hereinafter, description will be made to preferred embodiments of a method for producing a decolorized polyester, a decolorized polyester and a decolorizing agent according to the present invention in detail.

The method for producing a decolorized polyester according to the present invention includes: a step of preparing a polyester colored with a colorant (hereinafter, also referred to as "colored polyester") and a decolorizing agent containing a glycol ether-type compound having a boiling point at atmospheric pressure of 160° C. or higher; and a step of removing the colorant, by bringing the decolorizing agent into contact at least once with the colored polyester while heating the decolorizing agent to a temperature equal to or lower than a melting point of the polyester, to thereby obtain the decolorized polyester (hereinafter, also referred to as "decolorized polyester").

Examples of the polyester include polyethylene terephthalate (PET), polytrimethylene terephthalate (PTT), polybutylene terephthalate (PBT), polyethylene naphthalate (PEN), polybutylene naphthalate (PBN) and the like.

The polyester targeted in the present invention preferably contains PET as a main component thereof. Such a polyester may contain other materials such as cotton and nylon (polyamide), and may contain other plastic components used for purposes such as surface modification.

An amount of PET contained in the polyester is not particularly limited, but is preferably 65 mass % or more, more preferably 75 mass % or more, even more preferably 85 mass % or more, and particularly preferably 95 mass % or more. It is to be noted that an upper limit value thereof is 100 mass %. The use of the present invention is highly effective to decolorize a colored polyester obtained by coloring the above polyester with the colorant.

The colorant to be used for coloring (dyeing) the polyester is roughly classified into a dye and a pigment.

Examples of the dye include a disperse dye, a naphthol dye, a mordant dye, a vat dye and the like, and a disperse dye is preferable. This disperse dye binds to the polyester by an intermolecular force and is therefore most suitable for coloring the polyester. Further, according to the study of the present inventors, it has been found that the use of the present invention for removing the disperse dye is highly effective.

Examples of such a disperse dye include compounds classified as C.I. Disperse Black, compounds classified as C.I. Disperse Blue, compounds classified as C.I. Disperse Red, compounds classified as C.I. Disperse Orange, compounds classified as C.I. Disperse Yellow, compounds classified as C.I. Disperse Green, compounds classified as C.I. Disperse Violet, compounds classified as C.I. Disperse Brown and the like.

On the other hand, examples of the pigment include compounds classified as C.I. Pigment Black, compounds classified as C.I. Pigment Blue, compounds classified as C.I. Pigment Red, compounds classified as C.I. Pigment Orange, compounds classified as C.I. Pigment Yellow, compounds classified as C.I. Pigment Green, compounds classified as C.I. Pigment Violet, compounds classified as C.I. Pigment Brown and the like.

In the present invention, a mechanism, by which the colored polyester is decolorized, is not clear, but is likely to be because the colorant itself or a chromophore contained in the colorant is eluted (extracted) into the decolorizing agent and removed from the polyester.

Therefore, for example, when a colorant having a chromophore containing nitrogen atoms is used for coloring, a degree of decolorization can be confirmed by measuring an amount (residual amount) of the nitrogen atoms contained in the decolorized polyester.

Specifically, the amount of the nitrogen atoms contained in the decolorized polyester (decolorized polyester of the present invention) is preferably 30 ppm or less, more preferably in the range of about 0.1 to 20 ppm, and even more preferably in the range of about 0.1 to 10 ppm. If the decolorized polyester contains the nitrogen atoms in the above range amount, a coloring degree of polyester products recycled by the chemical recycling is sufficiently low (color b value of less than 8), and thus the quality thereof is high. From the viewpoint of further lowering the coloring degree of the recycled polyester product, it is preferable that the amount of the nitrogen atoms contained in the decolorized polyester is as small as possible. However, if a small amount of the nitrogen atoms remained in the decolorized polyester, it can be used as, for example, a footprint mark indicating that the polyester product is recycled and the like.

The decolorizing agent (decolorizing agent of the present invention) contains a glycol ether-type compound having a boiling point at atmospheric pressure of 160° C. or higher. The boiling point at atmospheric pressure of the glycol ether-type compound is preferably in the range of about 170 to 330° C., more preferably in the range of about 190 to 310° C., and even more preferably in the range of about 210 to 290° C.

If a decolorizing agent having such a relatively high boiling point is used, the decolorizing agent can be sufficiently heated without pressurization. This makes it possible to apply a high temperature to the colored polyester to be decolorized. As a result, movement of chain molecules of the polyester can be promoted, and sufficient intermolecular gaps can be formed therebetween. Therefore, the colorant or the chromophore can leave from the polyester, and becomes easier to be eluted into the heated decolorizing agent (hereinafter, also referred to as "heated decolorizing agent").

Further, from the viewpoint of further enhancing the effect of the present invention, it is preferable to prevent the colorant or the chromophore once eluted in the heated decolorizing agent from being incorporated into the polyester again, that is, it is preferable that the decolorizing agent has high solubility of the colorant or the chromophore.

Furthermore, it is preferable that the decolorizing agent not only has the high solubility of the colorant or the chromophore, but also does not easily damage the polyester.

Here, examples of the glycol ether-type compound include glycol monoether and glycol diether, and the glycol monoether is preferable. The glycol monoether has sufficiently high solubility of the colorant or the chromophore. On the other hand, the glycol monoether is less likely to damage the polyester, and thus can appropriately prevent or suppress the weight loss of the polyester after decolorization. Further, when it is desired to maintain a shape before decolorization (for example, a fiber shape), such a shape can be maintained.

Further, the number of carbon atoms of the glycol ether-type compound is preferably in the range of 5 to 15, more preferably in the range of 6 to 12, and even more preferably in the range of 8 to 10. The use of the glycol ether-type compound having such a number of carbon atoms makes it possible to further enhance the decolorizing effect of the colored polyester due to the decolorizing agent.

Specific examples of the glycol ether-type compound include ethylene glycol monoaliphatic ethers such as triethylene glycol monohexyl ether (boiling point: 321° C.), diethylene glycol monohexyl ether (boiling point: 261° C.), ethylene glycol monohexyl ether (boiling point: 208° C.), triethylene glycol monobutyl ether (boiling point: 276° C.), diethylene glycol monobutyl ether (boiling point: 230° C.), ethylene glycol monobutyl ether (boiling point: 171° C.), tripropylene glycol monomethyl ether (boiling point: 241° C.), dipropylene glycol monomethyl ether (boiling point: 188° C.), diethylene glycol monomethyl ether (boiling point: 194° C.) and tetraethylene glycol monoheptyl ether; ethylene glycol monoaromatic ethers such as ethylene glycol monophenyl ether (boiling point: 237° C.), diethylene glycol monophenyl ether (boiling point: 298° C.), propylene glycol monophenyl ether (boiling point: 243° C.) and the like. It is to be noted that these compounds may be used alone or in combination of two or more.

Further, the decolorizing agent may contain water or other organic solvents in addition to the glycol ether-type compound. Examples of the organic solvents include benzene, toluene, xylene, diethyl ether, ethyl acetate, acetone, ethylene glycol (monoethylene glycol), diethylene glycol, triethylene glycol and the like.

However, in order to maintain the preferable boiling point at atmospheric pressure of the decolorizing agent in the range of about 210 to 290° C., an amount of the glycol ether-type compound contained in the decolorizing agent is preferably 80 mass % or more, more preferably 90 mass % or more, and even more preferably 100 mass %. The use of the decolorizing agent containing the glycol ether-type compound in such an amount makes it possible to further enhance the decolorizing effect of the colored polyester while preventing or suppressing damage to the polyester.

According to the study of the present inventors, it has been found that when a decolorizing agent containing a compound other than the glycol ether-type compound (for example, monoethylene glycol, xylene and the like) alone is used, a sufficient decolorizing effect thereof cannot be obtained.

Further, it has also been found that when a decolorizing agent containing a glycol-type compound having hydroxyl groups at both ends of a molecular chain thereof, such as monoethylene glycol, alone is used, the damage to the polyester becomes extremely large.

At the time of decolorization, it is preferable that the decolorizing agent is heated to a temperature equal to or lower than the melting point of the polyester, and used as a heated decolorizing agent.

A heating temperature of the decolorizing agent (temperature of the heated decolorizing agent) is not particularly limited, but is preferably in the range of about 160 to 210° C., more preferably in the range of about 170 to 200° C., and even more preferably in the range of about 170 to 195° C. By using the heated decolorizing agent at such a temperature, the movement of the chain molecules of the polyester is further promoted, and the solubility of the colorant or the chromophore is further increased. This makes it possible to further enhance the decolorizing effect thereof, and to more reliably prevent or suppress the weight loss of the polyester.

A contact time per once of the heated decolorizing agent with the colored polyester is not particularly limited, but is preferably in the range of about 5 to 30 minutes, more preferably in the range of about 7.5 to 25 minutes, and even more preferably in the range of about 10 to 20 minutes.

The number of contacts of the heated decolorizing agent with the colored polyester is appropriately set according to a type and an amount of the colorant, and is preferably in the range of 1 to 7 times, more preferably in the range of 1 to 4 times, and even more preferably in the range of 2 to 4 times. In the case where the heated decolorizing agent is brought into contact with the colored polyester at a plurality of times, the heated decolorizing agent to be used at a second time onward is preferably changed to a new heated decolorizing agent.

Further, in each contact of the heated decolorizing agent with the colored polyester, an amount of the heated decolorizing agent brought into contact with 1 part by mass of the colored polyester is preferably in the range of about 1 to 10 parts by mass, and more preferably in the range of about 3 to 7 parts by mass.

By performing the decolorizing operation under the above conditions, it is possible to further enhance the decolorizing effect of the colored polyester due to the decolorizing agent.

The contact of the heated decolorizing agent with the colored polyester may be a batch type, a continuous type in which the heated decolorizing agent is continuously passed through the polyester, or a combination thereof.

Further, the contact of the heated decolorizing agent with the colored polyester may be performed by putting the colored polyester and the decolorizing agent into the treatment tank, and then heating the decolorizing agent.

It is preferable that the used decolorizing agent is purified by an evaporation operation, a distillation operation or the like, and then reused. On the other hand, the colorant component (colorant or chromophore) is preferably concentrated as an evaporation residue and a distillation can residue, and then disposed as industrial waste.

Therefore, considering energy consumption when performing the evaporation operation, the distillation operation or the like, it is advantageous to select a compound having a small latent heat of vaporization as the decolorizing agent. The latent heat of vaporization of the glycol ether-type compound described above is as small as 267 to 368 kJ/kg (64 to 88 kcal/kg) under atmospheric pressure conditions, which is very economical. The latent heat of evaporation of ethylene glycol (monoethylene glycol) constituting a skeleton structure of PET, which is a typical example of polyester, is 850 kJ/kg (203 kcal/kg) under atmospheric pressure. The latent heat of evaporation of ethylene glycol is about three times as high as that of the above-mentioned glycol ether. Therefore, superiority of the glycol ether-type compound is clear.

As a method for removing the decolorizing agent remaining on a surface of the decolorized polyester, a centrifugation method, a drying method or the like can be used, or a washing method with ethylene glycol constituting the skeleton structure of PET can also be used. In this case, in order to enhance the removing effect, it is preferable to heat ethylene glycol to about 100 to 120° C. before use. The decolorizing agent and ethylene glycol after use can be easily separated from a mixed solution thereof by a distillation operation or the like, and then reused.

Examples of a shape of the polyester include fibrous, flaky, particle, massive or the like, and the polyester is preferably fibrous or flaky (scaly), and more preferably fibrous. Fibrous or flaky colored polyester (particularly fibrous polyester, i.e., polyester fibers) can increase a contact area with the heated decolorizing agent. As a result, it is easy to enhance the decolorizing effect of the colored polyester due to the decolorizing agent.

Further, the colored polyester fiber may be in the form of clothing without cutting, or in the form of cut or crushed flakes, but is preferably in the form of clothing. A bulk density thereof is in the range of 0.10 to 0.14 g/cm³ (without compression) in the form of clothing, and 0.08 to 0.10 g/cm³ (without compression) in the form of flakes. That is, the bulk density of the colored polyester fibers is maintained higher in the form of clothing than in the form of flakes.

Therefore, it is easy to impregnate the heated decolorizing agent into the colored polyester fibers, and it is possible to prevent an increase in the used amount thereof. As a result, the amount of energy required for the evaporation operation, the distillation operation or the like of the decolorizing agent can be reduced. In addition, it is also possible to prevent a handling process of the cut polyester fibers (thin section) after decolorization from becoming complicated.

Although the method for producing a decolorized polyester according to the present invention, the decolorized polyester and the decolorizing agent have been described above, the present invention is not limited thereto.

For example, the method for producing a decolorized polyester according to the present invention may be replaced with arbitrary steps in each of which the same effect is exhibited, or arbitrary steps to be performed for predetermined purposes may be added.

Further, the decolorizing polyester and the decolorizing agent according to the present invention may be replaced with arbitrary configurations in each of which the same effect is exhibited, or arbitrary configurations may be added.

EXAMPLES

Hereinafter, more detailed description will be made on the present invention with reference to examples thereof. It is to be noted that the present invention is not limited to these examples.

1. Decolorization of Clothing Made of Colored PET Fibers (Polyester Fibers) and Manufacture of Recycled PET

Example 1

First, 450 g in total of two articles of clothing made of PET fibers colored with a black disperse dye and a blue disperse dye (hereinafter, also referred to as "colored clothing") was put into a 5 L flask. In this regard, the colored clothing was uncut, a bulk density thereof was 0.12 g/cm³, and an amount of nitrogen atoms contained therein was 850 ppm. 2,970 g of a heated decolorizing agent obtained by heating diethylene glycol monohexyl ether (number of carbon atoms: 10) to a temperature of 180° C. as a decolorizing agent was added thereinto, and then a first decolorization operation was performed for 10 minutes without stirring. Thereafter, a solid-liquid separation operation, in which the clothing (clothing after first decolorization operation) was separated from the decolorizing agent containing the dyes through a wire mesh, was performed.

Next, the clothing with the decolorizing agent used for the first time still maintained on a surface thereof was put into the 5 L flask again. 2,970 g of a new heated decolorizing agent (diethylene glycol monohexyl ether) having a temperature of 180° C. was added thereinto, and then a second decolorization operation was performed for 10 minutes without stirring. Thereafter, a solid-liquid separation operation, in which the clothing (clothing after second decolorization operation) was separated from the decolorizing agent containing the dyes through the wire mesh, was performed.

Next, a third decolorization operation was performed under the same method and conditions as above. Thereafter, a solid-liquid separation operation, in which the clothing (clothing after third decolorization operation) was separated from the decolorizing agent containing the dyes through the wire mesh, was performed. In this way, the clothing with the decolorizing agent used for the third time still maintained on the surface thereof was collected.

Next, the decolorized white clothing (hereinafter, also referred to as "decolorized clothing") was centrifuged to separate the decolorizing agent used for the third time maintained on the surface thereof, to thereby obtain a dry decolorized clothing. It is to be noted that weight loss (mass reduction ratio) of the dry decolorized clothing was 4.8%.

Further, the residual amount of the nitrogen atoms contained in the dry decolorized clothing was 20 ppm.

Thereafter, 400 g of the dry decolorized clothing was treated according to a chemical recycling process described below, to obtain bis-2-hydroxyethyl terephthalate (hereinafter, also referred to as "BHET") which is a PET monomer, and then recycled PET was manufactured.

<Depolymerization Reaction Step>

First, 400 g of the dry decolorized clothing was mixed with a mixture of 2,245 g of ethylene glycol (EG) preheated to 195° C. and 1 g of sodium hydroxide as a depolymerization catalyst, and reacted with each other for 5.5 hours at normal pressure without stirring. As a result, a depolymerization solution containing BHET was obtained.

<Solid Matter Filtration Step>

Next, the depolymerization solution was hot-filtered through a wire mesh strainer having a mesh opening of 30 mesh, to thereby obtain a solid matter filtration depolymerization solution. In this solid matter filtration step, matters other than PET (fasteners used in clothing, cotton components, plastic components other than PET and the like) were mainly removed.

<Depolymerization Solution Concentration Step>

Next, the solid matter filtration depolymerization solution was sent to a thin film evaporator so that excess EG was distilled off under the conditions in which a jacket heat medium temperature was 140° C. and an evaporator internal pressure was 400 Pa (3.0 mmHg). In this way, a concentrated depolymerization solution, in which solid components containing BHET were concentrated, was obtained.

<BHET Evaporation Purification Step>

Next, the concentrated depolymerization solution was sent to a short-stroke thin film evaporator (manufactured by VTA, Germany), and BHET was evaporated and distilled off under the conditions in which a jacket heat medium temperature was 190° C. and an evaporator internal pressure was 13 Pa (0.1 mmHg). In this way, BHET was collected from the concentrated depolymerization solution. The residual amount of the nitrogen atoms contained in the collected BHET was 16 ppm.

<BHET Crystallization Step>

Next, 1 part by weight of BHET and 4 parts by weight of distilled water were put into a 5 L flask, heated until a temperature of the inside liquid had reached 80° C., to thereby dissolve BHET in distilled water. Thereafter, the inside liquid was naturally cooled so that the temperature thereof was lowered to 20° C. In this way, crystals of BHET were precipitated.

<Solid-Liquid Separation Step>

Next, a solid-liquid separation operation, in which the precipitated crystals of BHET was separated from the distilled water by a Nutche-type solid-liquid separator was performed, to obtain wet crystallized BHET containing the distilled water. Next, the distilled water was removed from the wet crystallized BHET at a low temperature of 40° C. to dry it. In this way, dry crystallized BHET was obtained. The residual amount of the nitrogen atoms contained in the finally obtained dry crystallized BHET was 6.5 ppm.

Next, the obtained dry crystallized BHET was subjected to a polycondensation reaction according to a conventional method, to thereby obtain PET (recycled PET).

Example 2

Dry crystallized BHET and recycled PET were obtained in the same manner as in Example 1 except that triethylene glycol monobutyl ether (number of carbon atoms: 10) was used instead of diethylene glycol monohexyl ether as the decolorizing agent.

Example 3

Dry crystallized BHET and recycled PET were obtained in the same manner as in Example 1 except that tripropylene glycol monomethyl ether (number of carbon atoms: 10) was used instead of diethylene glycol monohexyl ether as the decolorizing agent.

Example 4

Dry crystallized BHET and recycled PET were obtained in the same manner as in Example 1 except that ethylene glycol monohexyl ether (number of carbon atoms: 8) was used instead of diethylene glycol monohexyl ether as the decolorizing agent.

Example 5

Dry crystallized BHET and recycled PET were obtained in the same manner as in Example 1 except that ethylene glycol monobutyl ether (number of carbon atoms: 6) was used instead of diethylene glycol monohexyl ether as the decolorizing agent, and the heating temperature of the decolorizing agent was changed to 170° C.

Example 6

Dry crystallized BHET and recycled PET were obtained in the same manner as in Example 1 except that diethylene glycol monomethyl ether (number of carbon atoms: 5) was used instead of diethylene glycol monohexyl ether as the decolorizing agent.

Example 7

Dry crystallized BHET and recycled PET were obtained in the same manner as in Example 1 except that triethylene glycol monohexyl ether (number of carbon atoms: 12) was used instead of diethylene glycol monohexyl ether as the decolorizing agent.

Example 8

Dry crystallized BHET and recycled PET were obtained in the same manner as in Example 1 except that tetraethylene glycol monoheptyl ether (carbon atom number: 15) was used instead of diethylene glycol monohexyl ether as the decolorizing agent.

Example 9

Dry crystallized BHET and recycled PET were obtained in the same manner as in Example 1 except that a mixed solution containing 60 parts by mass of ethylene glycol monohexyl ether (number of carbon atoms: 8) and 40 parts by mass of dipropylene glycol monomethyl ether (number of carbon atoms: 8) instead of diethylene glycol monohexyl ether as the decolorizing agent.

Example 10

Dry crystallized BHET and recycled PET were obtained in the same manner as in Example 1 except that a mixed solution containing 90 parts by mass of diethylene glycol monomethyl ether (number of carbon atoms: 5) and 10 parts by mass of diethylene glycol diethyl ether (number of carbon atoms: 8) was used instead of diethylene glycol monohexyl ether as the decolorizing agent.

Example 11

Dry crystallized BHET and recycled PET were obtained in the same manner as in Example 1 except that a mixed solution containing 80 parts by mass of ethylene glycol monohexyl ether (number of carbon atoms: 8) and 20 parts by mass of monoethylene glycol (EG) was used instead of diethylene glycol monohexyl ether as the decolorizing agent.

Example 12

Dry crystallized BHET and recycled PET were obtained in the same manner as in Example 1 except that the heating temperature of the decolorizing agent was 165° C. and the contact time of the heated decolorizing agent with the colored clothing was 20 minutes.

Comparative Example 1

Dry crystallized BHET and recycled PET were obtained in the same manner as in Example 1 except that monoethylene glycol (number of carbon atoms: 2) was used instead of diethylene glycol monohexyl ether as the decolorizing agent.

Comparative Example 2

Dry crystallized BHET and recycled PET were obtained in the same manner as in Comparative Example except that the heating temperature of the decolorizing agent was 195° C. and the contact time of the heated decolorizing agent with the colored clothing was 30 minutes.

2. Measurement

2-1. Measurement of Amount of Nitrogen Atoms

An amount of nitrogen atoms contained in each of the colored clothing, the decolorized clothing and the dry crystallized BHET was measured using a trace total nitrogen analyzer (manufactured by Mitsubishi Chemical Analytech Co., Ltd., "TN-2100H").

2-2. Measurement of Color b Value

A color b value of the recycled PET was measured using a color difference meter (manufactured by Nippon Denshoku Co., Ltd., "SE-7700").

The above results are summarized in Table 1.

In each example, it was possible to sufficiently decolorize the colored clothing while suppressing the weight loss of PET.

Further, the color b value of the recycled PET obtained in each example was the same as or close to that of commercially available products. Furthermore, the recycled PET obtained in each example had values comparable to those of the commercially available products in inspection items such as an ultimate viscosity (IV), a DEG content, carboxyl terminal groups, and a melting point.

On the other hand, in each comparative example, the weight loss of PET was severe, and the decolorizing effect of the colored clothing was not sufficiently obtained.

Further, when the colored flakes are decolorized in the same manner as in the above example, the same result as described above is obtained.

Furthermore, when the colored clothing is decolorized using an ethylene glycol monoaromatic ether instead of the ethylene glycol monoaliphatic ether in the same manner as in the above example, the same result as described above is obtained.

3. Decolorization of Colored PET Bottle Flakes (Polyester Flakes) and Manufacture of Recycled PET First, 450 g of PET bottle flakes colored with a pigment (hereinafter, also referred to as "colored flakes") was put into a 5 L flask. In this regard, the colored flakes were obtained by crushing PET bottles into 8 to 10 mm squares, a bulk density thereof was 0.28 $g/cm^3$, and an amount of nitrogen atoms contained therein was 420 ppm. 2,970 g of a heated

TABLE 1

| | Decolorizing agent | | Decolorization processing conditions Teating | Weight loss of dry | Residual amount of nitrogen atoms (ppm) | | Color b |
|---|---|---|---|---|---|---|---|
| | Glycol ether-type compound (number of carbon atoms): parts by mass | Other: parts by mass | temp. (° C.) × Contact time (minutes) | decolorized clothing (%) | Dry decolorized clothing | Dry crystallized BHET | value of recycled PET |
| Ex. 1 | Diethylene glycol monohexyl ether (10):100 | — | 180 × 10 | 4.8 | 20 | 6.5 | 6.0 |
| Ex. 2 | Triethylene glycol monobutyl ether (10):100 | — | 180 × 10 | 6.1 | 18 | 6.0 | 5.4 |
| Ex. 3 | Tripropylene glycol monomethyl ether (10):100 | — | 180 × 10 | 5.4 | 24 | 10.5 | 7.2 |
| Ex. 4 | Ethylene glycol monohexyl ether (8):100 | — | 180 × 10 | 4.5 | 18 | 5.8 | 5.2 |
| Ex. 5 | Ethylene glycol monobutyl ether (6):100 | — | 170 × 10 | 3.0 | 48 | 30 | 13.2 |
| Ex. 6 | Diethylene glycol monomethyl ether (5):100 | — | 180 × 10 | 3.8 | 22 | 9.0 | 7.8 |
| Ex. 7 | Triethylene glycol monohexyl ether (12):100 | — | 180 × 10 | 6.5 | 15 | 5.7 | 5.2 |
| Ex. 8 | Tetraethylene glycol monoheptyl ether (15):100 | — | 180 × 10 | 7.6 | 17 | 5.3 | 5.0 |
| Ex. 9 | Ethylene glycol monohexyl ether (8):60 Dipropylene glycol monomethyl ether (8):40 | — | 180 × 10 | 4.4 | 20 | 5.8 | 5.3 |
| Ex. 10 | Diethylene glycol monomethyl ether (5):90 Diethylene glycol diethyl ether (8):10 | — | 180 × 10 | 4.9 | 28 | 10.8 | 8.3 |
| Ex. 11 | Ethylene glycol monohexyl ether (8):80 | EG:20 | 180 × 10 | 7.4 | 30 | 12.1 | 8.4 |
| Ex. 12 | Diethylene glycol monohexyl ether (10):100 | — | 165 × 20 | 4.1 | 38 | 23.0 | 8.6 |
| Comp. Ex. 1 | Monoethylene glycol (2):100 | — | 180 × 10 | 10.8 | 65 | 36.0 | 13.2 |
| Comp. Ex. 2 | Monoethylene glycol (2):100 | — | 195 × 30 | 14.8 | 42 | 18.0 | 10.2 | decolorizing agent obtained by heating diethylene glycol monohexyl ether (number of carbon atoms: 10) to a temperature of 195° C. as a decolorizing agent was added thereinto, and then a first decolorization operation was performed for 15 minutes without stirring. Thereafter, a solid-liquid separation operation, in which the flakes (flakes after first decolorization operation) was separated from the decolorizing agent containing the pigment through a wire mesh, was performed.

Next, the flakes with the decolorizing agent used for the first time still maintained on a surface thereof was put into the 5 L flask again. 2,970 g of a new heated decolorizing agent (diethylene glycol monohexyl ether) having a temperature of 195° C. was added thereinto, and then a second decolorization operation was performed for 15 minutes without stirring. Thereafter, a solid-liquid separation operation, in which the flakes (flakes after second decolorization operation) was separated from the decolorizing agent containing the pigment through the wire mesh, was performed.

Next, a third decolorization operation was performed under the same method and conditions as above. Thereafter, a solid-liquid separation operation, in which the flakes (flakes after third decolorization operation) was separated from the decolorizing agent containing the pigment through the wire mesh, was performed. In this way, the flakes with the decolorizing agent used for the third time still maintained on the surface thereof was collected.

Next, the decolorized flakes (hereinafter, also referred to as "decolorized flakes") was centrifuged to separate the decolorizing agent used for the third time maintained on the surface thereof, to thereby obtain dry decolorizing flakes. It is to be noted that weight loss (mass reduction ratio) of the decolorized flakes was 7.8%.

Further, a residual amount of nitrogen atoms contained in the dry decolorized flakes was 16 ppm.

Thereafter, 400 g of the dry decolorized flakes were treated according to the same chemical recycling process as in Example 1, to obtain BHET, and then recycled PET was produced.

An amount of nitrogen atoms contained in each of the colored flakes, the decolorized flakes and the dry crystallized BHET, and the color b value of the recycled PET were measured by the same method as shown in the above item "2. Measurement". As a result, the residual amount of nitrogen atoms contained in the dry crystallized BHET was 5.1 ppm. The color b value of PET (recycled PET) obtained by polycondensation reaction of the dry crystallized BHET according to a conventional method was 4.5. And it had values comparable to those of the commercially available products in the inspection items such as the ultimate viscosity (IV), the DEG content, the carboxyl terminal group, and the melting point.

INDUSTRIAL APPLICABILITY

According to the present invention, it is possible to provide the decolorized polyester by removing the colorant or the chromophore from the colored polyester. Further, the combination of the present invention with the chemical recycling method makes it possible to recycle the colored polyester, which has been incinerated and landfilled, into polyester products having high quality again. This is very meaningful in terms of resource saving and environmental protection.

What is claimed is:

1. A method for producing a decolorized polyester, comprising:
    a step of preparing a polyester colored with a colorant, and a decolorizing agent consisting of a glycol monoether having a boiling point at atmospheric pressure of 160° C. or higher; and
    a step of removing the colorant, by bringing the decolorizing agent into contact at least once with the colored polyester while heating the decolorizing agent to a temperature equal to or lower than a melting point of the polyester, to thereby obtain the decolorized polyester.

2. The method for producing a decolorized polyester as claimed in claim 1, wherein the number of carbon atoms of the glycol monoether is in the range of 5 to 15.

3. The method for producing a decolorized polyester as claimed in claim 1, wherein a heating temperature of the decolorizing agent is in the range of 160 to 210° C.

4. The method for producing a decolorized polyester as claimed in claim 1, wherein a contact time per once of the heated decolorizing agent with the colored polyester is in the range of 5 to 30 minutes.

5. The method for producing a decolorized polyester as claimed in claim 1, wherein the number of contacts of the heated decolorizing agent with the colored polyester is in the range of 1 to 7 times.

6. The method for producing a decolorized polyester as claimed in claim 1, wherein in each contact of the heated decolorizing agent with the colored polyester, an amount of the heated decolorizing agent brought into contact with 1 part by mass of the colored polyester is in the range of 1 to 10 parts by mass.

7. The method for producing a decolorized polyester as claimed in claim 1, wherein the colorant has a chromophore containing nitrogen atoms, and an amount of the nitrogen atoms contained in the decolorized polyester is 30 ppm or less.

8. The method for producing a decolorized polyester as claimed in claim 1, wherein the polyester contains 65 mass % or more of polyethylene terephthalate.

9. The method for producing a decolorized polyester as claimed in claim 1, wherein the colorant contains a disperse dye.

10. The method for producing a decolorized polyester as claimed in claim 1, wherein the polyester is fibrous or flaky.

11. The method for producing a decolorized polyester as claimed in claim 1, wherein the colored polyester which is fibrous is in the form of clothing.

* * * * *